United States Patent [19]

Press

[11] 4,036,209
[45] July 19, 1977

[54] ATMOSPHERIC HEAT EXCHANGE METHOD AND APPARATUS

[76] Inventor: Jack J. Press, 17426 Plaza Destacado, San Diego, Calif. 92128

[21] Appl. No.: 590,644

[22] Filed: June 26, 1975

[51] Int. Cl.² .............................................. F24J 3/02
[52] U.S. Cl. .................................................. 126/271
[58] Field of Search ................ 126/270, 271, 400; 237/1 A

[56] References Cited

U.S. PATENT DOCUMENTS

| | | | |
|---|---|---|---|
| 2,427,262 | 9/1947 | Delano | 126/271 |
| 3,029,806 | 4/1962 | Okuda | 126/271 |
| 3,076,450 | 2/1963 | Gough et al. | 126/271 |
| 3,102,532 | 9/1963 | Shoemaker | 126/270 |
| 3,145,707 | 8/1964 | Thomason | 126/271 |
| 3,146,774 | 9/1964 | Yellott | 126/271 |
| 3,415,719 | 12/1968 | Telkes | 126/271 |
| 3,513,828 | 5/1970 | Masters | 126/271 |
| 3,799,145 | 3/1974 | Butterfield | 126/271 |
| 3,859,980 | 1/1975 | Crawford | 126/271 |
| 3,943,911 | 3/1976 | Yu | 126/271 |
| 3,949,732 | 4/1976 | Reines | 126/271 |
| 3,991,742 | 11/1976 | Gerber | 126/271 |

*Primary Examiner*—John J. Camby
*Assistant Examiner*—Henry C. Yuen
*Attorney, Agent, or Firm*—R. S. Sciascia; G. J. Rubens

[57] ABSTRACT

An atmospheric heat exchange method and apparatus is provided that is simple and inexpensive to construct and made from readily available, low cost materials; that is adaptable to be configured for mounting to a wide variety of existing structures; and which is highly efficient, lightweight and readily collapsible to facilitate storage and shipment.

8 Claims, 10 Drawing Figures

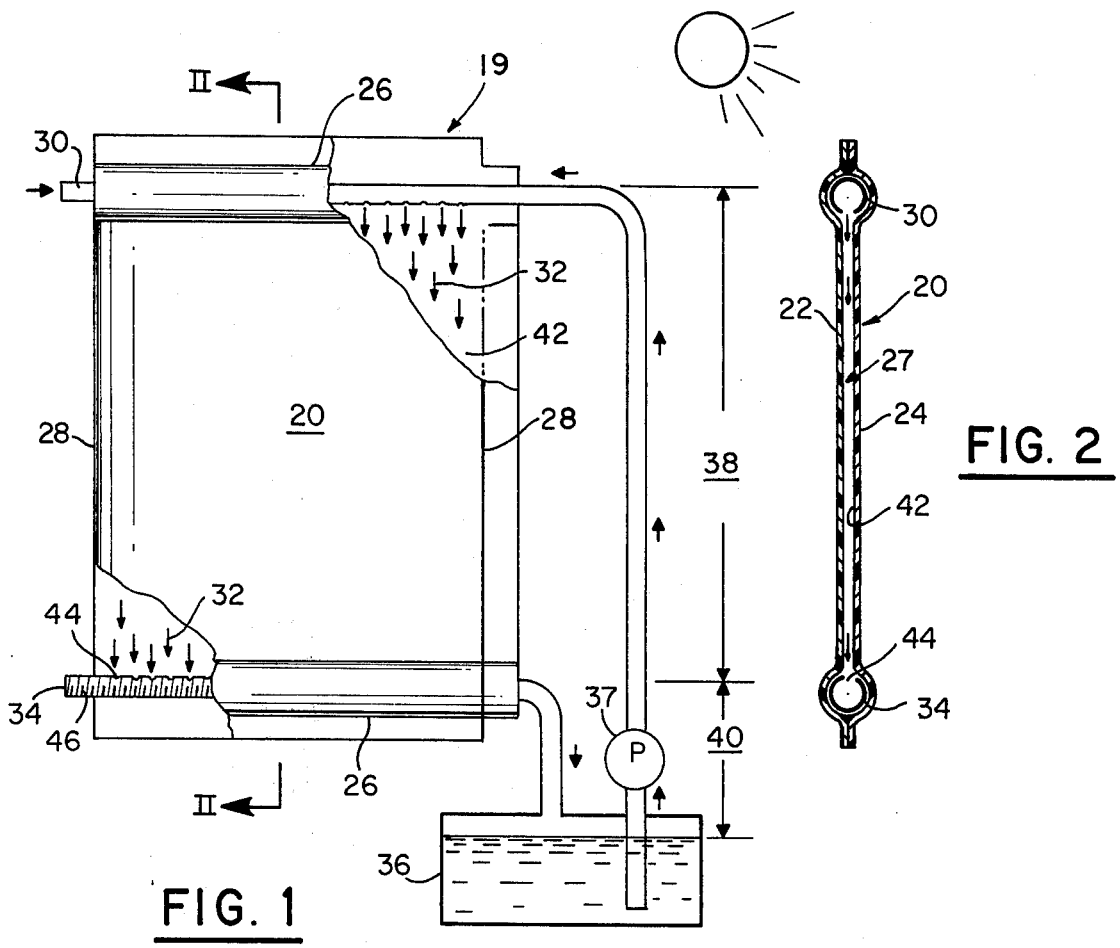
FIG. 1
FIG. 2
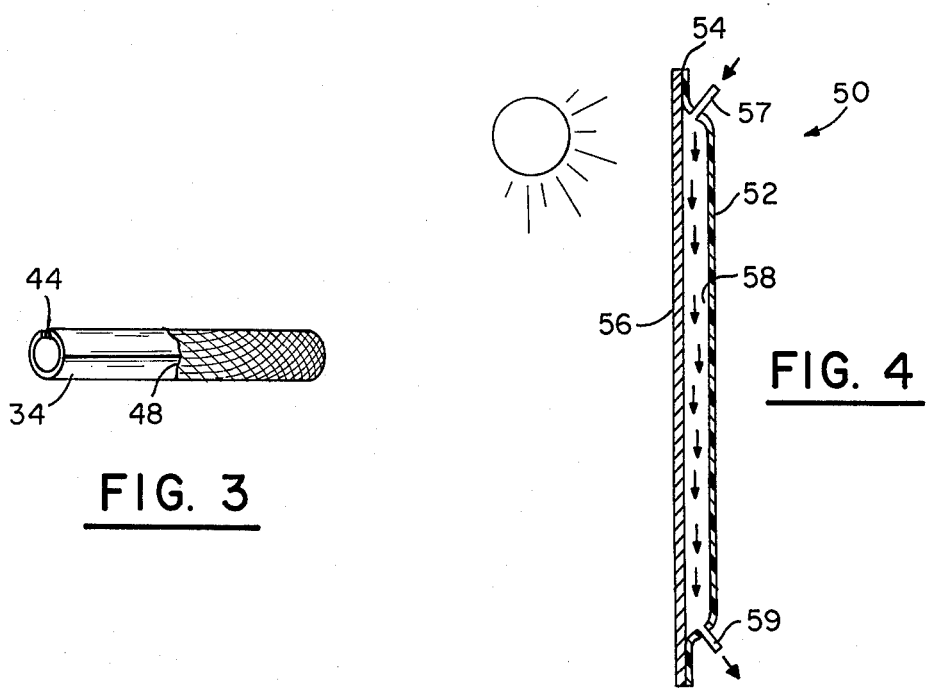
FIG. 3
FIG. 4

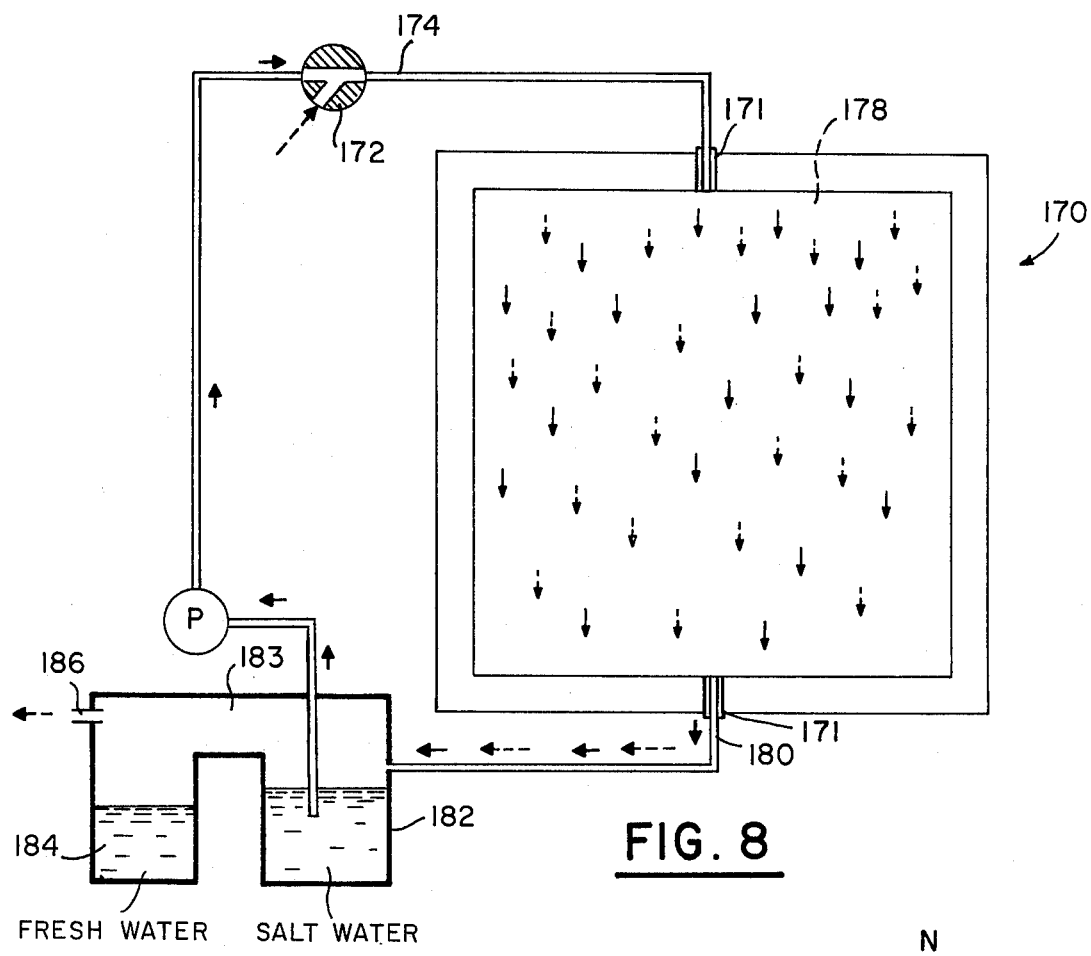
FIG. 8
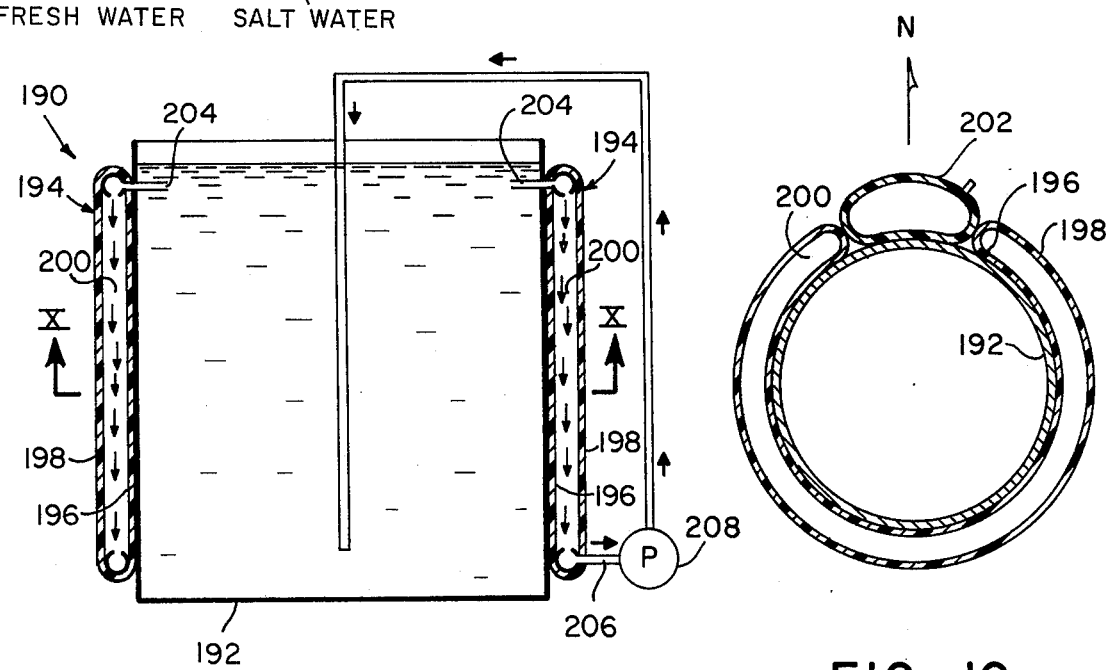
FIG. 9
FIG. 10

ATMOSPHERIC HEAT EXCHANGE METHOD AND APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to an atmospheric heat exchange method and apparatus, and more particularly to such an exchanger that can be used for atmospheric heating or cooling which is fabricated of highly pliable, plastic film to create a venturi liquid passageway of uniform thickness substantially throughout the dimensions of the exchanger.

Although the solar heat exchanger art is well developed, it is only recently, because of the energy shortage, that a renewed interest has been expressed in this field. For the most part, such exchangers are constructed of rigid panels utilizing metal pipes, corrugated sheet metal, etc. which causes the panels to be heavy in weight, and not readily adaptable to existing buildings or other structures. Of most concern is that such prior art exchangers are very expensive in construction and for installation. Because solar exchange systems require a large surface area for most all applications, even for the most elementary residential hot water use, the prior art designs are for the most part impractical because of the long period required for amortizing their high initial cost and installation charges.

A few non-rigid solar heat exchangers have been proposed, but they too have been constructed of relatively heavy, fabric-reinforced rubber sheets that are not only very costly in construction, but, because of their limited flexibility present an inherent problem with water distribution and with trapped air. In another instance a heat exchanger was constructed of a plurality of flexible plastic tubes, much like a garden hose, but such a system has limited efficiency and capacity.

SUMMARY OF THE INVENTION

An atmospheric heat exchanger is proposed which can be used for solar heating of water or natural cooling. The exchanger is constructed of a panel-shaped, multi-walled container, having at least one wall made of a pliable, polymeric film forming with the other wall a thin, unrestricted passageway substantially throughout the rectangular dimensions of said walls. The container passageway is provided with an inlet and an outlet for the circulation therethrough of a liquid medium, such as water. Most important, the passageway is maintained at a minimum thickness by the influence of a negative pressure on the flexible wall to create a venturi effect for increasing the rate of liquid flow through the exchanger, and for enhancing heat transfer to the circulating liquid medium. Where desirable a positive pressure, i.e., tension applied to the panel or a gas bubble cover can be utilized to assist the negative pressure in maintaining the optimum thickness of the passageway.

Because of the flexibility of the novel exchanger panel, it is adaptable to a wide variety of different supporting structures, some of which are illustrated and which may be already in existence. It is obvious that the panel construction may be used in a variety of different applications, i.e., hot or cold water usage for home use, swimming pools; the air-conditioning; space heating purposes; drying purposes; salt water distillation, among other uses.

STATEMENT OF THE OBJECTS OF THE INVENTION

Principal objects of this invention are: to provide an atmospheric heat exchange method and apparatus which is inexpensive and simple in construction; which is lightweight and readily conformable to a vast number of different supporting structures; which can be fabricated in a shop, collapsed and transported to a site or fabricated on location; which is efficient and reliable in operation; and which utilizes the internal and/or external suction that inherently exists in the exchanger system to maintain an efficient liquid flow through the panel.

Other objects, advantages and novel features of the invention will become apparent from the following detailed description of the invention when considered in conjunction with the accompanying drawings.

BRIEF DESCRIPTION OF THE DRAWINGS

FIG. 1 is a front elevation view of the novel heat exchanger shown suspended in a vertical position.

FIG. 2 is a longitudinal sectional view of the exchanger taken along line II—II of FIG. 1.

FIG. 3 is a side view of a portion of a modified outlet manifold utilizing a piece of tubular netting material for separating the plastic film from the outlet.

FIG. 4 is a longitudinal sectional view of a modified heat exchanger having the front panel wall constructed of a metal sheet, and the rear wall constructed of a conformable plastic film.

FIG. 8 is a longitudinal section of a solar heat exchanger similar to FIG. 1 but modified for use as a solar fresh water still.

FIG. 9 is a longitudinal sectional view of another embodiment shown supported around a hot water reservoir tank.

FIG. 10 is a cross-sectional view taken along X—X of FIG. 9.

DESCRIPTION OF THE PREFERRED EMBODIMENTS

Figure 5:
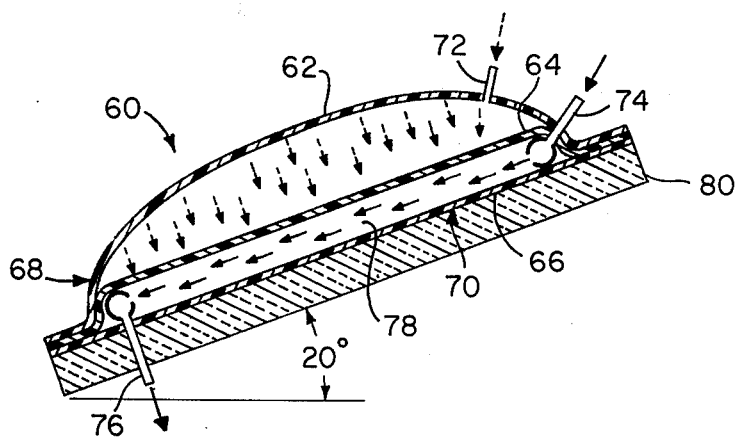
FIG. 5 is a longitudinal section view of another modified heat exchanger similar to FIG. 1 but mounted on an incline, the rear wall being supported on a sheet of insulation material, and the front wall being covered with an integral inflated, clear plastic film bubble.

Referring to the drawings where like reference numerals refer to similar parts throughout the figures there is shown in FIGS. 1 and 2 an atmospheric heat exchanger 19 constructed in accordance with the invention. Heat exchanger is referred to as an atmospheric heat exchanger because for the most part the exchanger can be utilized for generating hot water or air in solar applications, or for nocturnal cooling of water or air for air-conditioning purposes. Hereafter, the term solar heat exchanger is intended to cover both broad applications where applicable. Exchanger 19 is constructed in the form of a flat, envelope-shaped panel 20 having at least two walls, a front wall 22 and a rear wall 24, at least one of which walls being made of a thin, pliable polymeric film material. In this embodiment of the invention, both front and rear walls 22 and 24 are constructed of the conformable plastic film. For reasons later to be described, the conformability and other physical characteristics of these thin film walls are important features of the invention. The free edges 26 of walls 22 and 24 are joined together, such as by heat sealing or cementing, to form a liquid container 27, the overlapped edges conveniently providing a tie down flap for securing to any supporting structure, such as the type shown in FIGS. 5, 7 and 10 and for maintaining a tensile force on the panel. One or both edges 28 can be a folded edge of the film material, such as when the panel is constructed of tubular material.

For many installations water is the liquid that is most logical to use, especially where the panel is used for distilled water applications, however, liquids other than water that have a high flash point or have greater heat absorption characteristics can be used. Hereafter, when reference is made in this specification to water as the circulating medium it should be understood that a different liquid may be utilized where practicable.

A perforated pipe 30, if desired for structural support, is sealable secured within the top of panel 20, and can extend from both sides of the panel should it be desired to provide two inlets for the water that is to be circulated through the container panel, the downward water flow being indicated by the arrows 32. However, because of the uniform spreading of the water flow achieved by the novel panel construction, pipe 30 may be eliminated and a single inlet opening or openings provided along the top of the panel (see FIG. 8). Another perforated pipe 34 may be sealably secured within the bottom of panel 20 to provide a pair of outlets for the water flow. It is obvious, however, that only one inlet and outlet need be provided. Pipes 30 and 34 can be referred to manifold members, and need not extend throughout the width of the panel. Outlet manifold 34 leads to reservoir tank 36, which may be located above or below the ground level. In installations which do not create a substantial external suction that is applied to the panel, the perforated outlet pipe 34 as the outlet may not be necessary and may be replaced by any conventional discharge hose connection.

In FIGS. 1 and 2, panel is shown supported in a vertical position capable of being suspended from a fence or wall, although it could be disposed and supported at any suitable angle, depending on its orientation with the sun. Regardless of the panel orientation, the vertical height 38 of the inner dimensions of the panel container causes a water pressure drop, which can be referred to as an internal suction being a negative pressure. The distance 40 from the outlet 34 to reservoir 36, when present, causes another water drop and can be referred to as an external suction. As will be explained, both internal and/or external suction play an important role in this invention in maintaining a minimum thickness of a passageway 42 which is controlled by the total negative pressure applied between the front and rear flexible film walls 22 and 24. The negative pressure applied to film walls can be supplemented by a tensile force caused by stretching panel 20 during installation, and, as will be described later, by a positive pressure created by an air bubble. Because of the external suction that is present and applied to panel 20, and the conformability of front and rear film walls 22 and 24, where the panel is mounted at a low angle with respect to the horizontal, the thin walls may be sucked against the perforated outlet pipe 34. If exhaust manifold 34 has a smooth outer surface this action may substantially close perforations 44 in outlet pipe 34 and restrict the outlet flow. To eliminate this effect, the external surface of outlet pipe 34 may be roughened, such as by threading at 46 (FIG. 1), which maintains channels for the water flow between the thin walls and the outlet pipe. In FIG. 3, instead of utilizing a relatively expensive pipe threading operation, separation between the walls and the smooth outer surface of the outlet pipe can be maintained by using a commercially available, tubular plastic netting material 48, made under the name "VEXAR" by DuPont, which can be telescopically slipped over the outlet pipe.

As previously mentioned, the physical properties of the material of thin film walls 22 and 24, namely its conformability, plays a critical role of achieving applicant's novel results. At least one of walls 22 and 24 must be made of thin, plastic film material to provide the required conformability with the other wall. Such materials for the most part are very inexpensive and are readily available commercially as stock items. For example, a suitable plastic film can be polyethelene, preferably from 5 to 10 mils thick; the cost of a 6 mil film being about 2 cents/square foot. Another suitable film is polyvinyl chloride of a thickness of approximately 5 to 25 mils, a 6 mil thickness costs approximately 3 cents/square foot. Should a more durable and weather resistant film material be desired, "Teflon" of a thickness of 2 to 5 mils is suitable, but the cost per square foot is substantially more expensive. The polymeric film of which the walls of the panel container are constructed can be transparent or opaque, depending on whether it is desired that the sun's rays be transmitted or absorbed by the film wall, respectively. Although the thinness of the wall film is important from an economic consideration, the critical dimension of the thickness of water passageway 42 depends also on the flexural rigidity of the specific film material, or its degree of conformability; and the negative and positive pressures being applied to the panel container. The pertinent physical characteristics of some suitable polymeric films are listed in the following table.

TABLE 1

| Polymeric Film Conformity Factors | | | |
| --- | --- | --- | --- |
| Film | Weight (oz./sq.yd.) | Thickness (mils) | Flexural Rigidity ($10^{-4}$in.-lbs.) |
| "Mylar" | 5.15 | 5 | 74 |
| Polyethylene | 5 | 7 | 14 |
| Polyvinyl Chloride | 16 | 16 | 86 |
| " | 4 | 4 | 1 |
| " | 20 | 20 | 48 |
| " | 8.5 | 8.5 | 2 |
| " | 13 | 13 | 2.46 |
| " | 22.5 | 22.5 | 10.8 |
| "Teflon" | 8.6 | 5 | 14 |
| " | 3.4 | 2 | 0.84 |

The more rigid are the film walls 22 and 24, the greater the negative pressure that must be applied to the panel to maintain the optimum thickness of passageway 42 that enables the water to be substantially uniformly distributed over the entire panel. This feature is important if the panel is to achieve maximum heat transfer efficiency.

In operation, water from a given source, which can be make-up water, in addition to water from reservoir 36, is pumped by 37 to inlet pipe 30. To avoid any build-up of water in the panel passageway 42, which would defeat the purpose of this invention, namely, in maintaining a thin water layer in passageway 42, it is obvious that the water must be discharged in outlet pipe at a rate at least as fast as the water being admitted by inlet pipe 30. Because of the pliability of walls 22 and 24, the negative pressure draws walls 22 and 24 toward each other to reduce the thickness of passageway 42. Reducing the size of the passageway creates a venturi effect over the entire surface inside the panel, thereby increasing the velocity of the water flow through the panel. The thinness of the passageway ensures maximum heat transfer from the heated film walls to the water flowing in the passageway.

The minimum thickness of passageway 42 and the increased velocity of the water flow therethrough also minimizes the likelihood of the formation of air bubbles in the passageway, and, in fact, will remove occluded airpockets that may be formed therein.

Most important, the drawing together of the film walls 22 and 24 by the various applied pressures causes the circulated water to be automatically distributed substantially uniformly over the entire width and length of the thin passageway 42, which has the effect of increasing the heat exchange efficiency by obtaining maximum heat transfer for a given panel area. It is believed that an optimum thickness of water passageway 42 should vary from between 5 mils to 50 mils, depending on the particular application.

The following data has been obtained in one test of a panel constructed in accordance with the teaching of FIGS. 1 and 2.

The dimensions of panel 20 was 2 × 8 feet, with front film wall 22 facing the sun being transparent polyvinyl chloride of 22.5 mils, and rear wall 24 being opaque polyvinyl chloride of 20 mils. The panel was supported vertically by a suitable frame, not shown. A supply of 17 gallons of water was circulated through the panel at a rate of 5 gal/min with free discharge into tank 36. The internal suction 38 was an 8-foot water drop, which conformed the walls together spreading the water in passageway 42 to a layer thickness of approximately 10 mils. With no insulation present on either wall of the panel, the following heat rise in the circulating water was obtained:

| TEST No. | | | | |
|---|---|---|---|---|
| Date of test: | November 19, 1974 | | | |
| Location: | San Diego, California | | | |
| Orientation: | Southerly direction | | | |
| TIME | AIR TEMPERATURE | WATER TEMPERATURE | CLOUD COVER | WIND |
| 9:00 AM | 69° F | 74° F | none | light |
| 10:00 AM | 76° | 97° | none | light |
| 11:00 AM | 82° | 112° | none | light |

It is obvious that the thickness of the water layer in passageway 42 is dependent on both the rate of flow through the panel and the applied suction head and external pressure where present. For example, in test No. 1 a reduction of the water flow from 5 gal/min to 2 gal/min, reduced the water layer thickness from about 10 mils to 5 mils. The use of panel 20 heretofore described is applied to the solar heating of water. However, the identical panel construction can be utilized for nocturnal cooling of water for air cooling purposes.

The embodiment in FIG. 4 illustrates a heat exchanger panel 50 constructed of only one thin plastic conformal film wall 52, being a rear wall, which is adhesively secured around its edges at 54 to the rear surface of a front sheet metal wall 56 forming a water passageway 58 therebetween having inlet 57 and outlet 59. As shown in FIG. 4 the front metal wall 56, being an absorbing surface, is oriented toward the sun, in which case conformal film 52 can be clear plastic film, as it is not subjected to the destructive ultraviolet rays of the sun. The double layer panel of FIG. 1 can be used in FIG. 4 to eliminate the necessity of adhesively securing a single film wall 52 to obtain a water-tight attachment. As in panel 20 of FIG. 1, the thickness of the water layer in passageway 58 will also depend on the rate of water flow in the panel and the water suction drop. The type of thin plastic film for wall 52 can be chosen from Table I. Panel 50 can be oriented vertically or supported at a suitable angle with respect to the sun. As will be illustrated in FIGS. 5 and 6, one or both walls of panel 50 may be enclosed in an air bubble cover to reduce convection heat losses.

A third modification of the novel solar heat exchanger is shown in FIG. 5 where panel 60 is constructed of three separate thin plastic film walls 62, 64 and 66, all heat-sealed along their peripheral edges to form two containers 68 and 70. Container 68 is inflated with air through valve 72 to form an air bubble. Thin plastic film walls 64 and 66 form a water container 70 having an inlet 74 to and an outlet 76 from water passageway 78. Panel 60 is supported in an inclined orientation with the sun by a sheet of suitable insulation material 80.

Air bubble 68 has two functions: namely, it provides insulation to the upper surface of panel 60 reducing heat loss by conduction and convection, and, secondly, it provides a source of external positive pressure on water container 70 to assist the negative suction pressures in conforming films 64 and 66, thus ensuring a uniform width and minimum thickness of water passage 78.

The following data has been obtained in a test of a panel constructed in accordance with the teaching of FIG. 5. Film 62 was a clear plastic material, the thickness of which is not critical as long as it is sufficiently stiff to create 1 to 2 inches of ballooning to the bubble and to provide a conforming positive pressure, and which will not billow in the wind; film 64 was black polyvinyl chloride of 20 mils thickness; and film 66 was a clear polyvinyl chloride of 16 mils thickness. Of course, if it is desirable to maintain container 70 in a flat configuration, then it is necessary to anchor the peripheral edges thereto to avoid distortion by bubble 68.

A reservoir contained 17 gallons of water and the panel was provided with a flow rate of 10 gal/min. Dimensions of panel 60 was 2 × 8 feet, and oriented at a 20° elevation from the horizontal which provided a combiner inner and outer suction drop of 3 feet. The thickness of water passageway 78 was estimated to be 30-40 mils.

TEST No. 2
Date of Test: November 1974
Location: San Diego, California

| TIME | AIR TEMPERATURE | WATER TEMPERATURE | CLOUD COVER | WIND |
|---|---|---|---|---|
| 9:00 AM | 61° | 58° F | 50% | none |
| 10:00 AM | 70° | 78° | 50% | slight |
| 11:00 AM | 76° | 97° | 50% | moderate |
| 12:00 AM | 78° | 105° | 25% | " |
| 1:00 PM | 79° | 111° | 10% | " |
| 2:00 PM | 79° | 112° | 25% | " |
| 4.00 PM | 80° | 104° | 50% | " |

Figure 6:
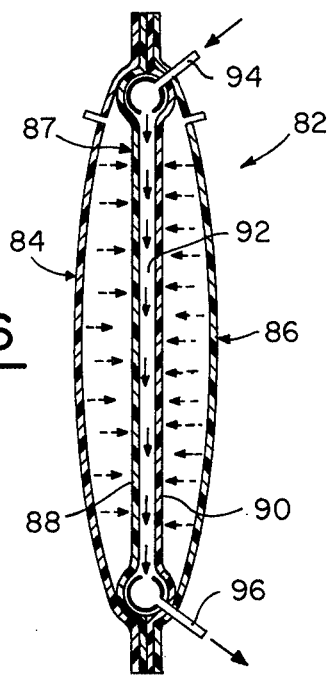
FIG. 6 is a longitudinal section view of another modification of the solar heat exchanger similar to FIG. 1, and mounted vertically with both walls covered with an inflated bubble.

Another version of the novel solar heat exchanger is shown in FIG. 6 where panel 82 is provided with air bubble containers 84 and 86, one on each outer side of water container 87 formed by thin conformable plastic film walls 88 and 90. Passageway 92 is formed between film walls 88 and 90, having a water inlet 94 and outlet 96. Panel 82 can be supported in any suitable manner, shown suspended in a vertical position, such as on a fence-like structure, and, if oriented in an East-West direction, one side of the panel will be subjected to the morning sun, and the other panel receptive to the afternoon sun. Similar to the modification of FIG. 5, air bubbles 84 and 86 are made of clear plastic material, and thin conformal film walls 88 and 90 are constructed of black plastic film, such as polyvinyl chloride. Air bubbles 84 and 86 in addition to providing an insulating layer, serve to apply a positive air pressure on both conformal walls 88 and 90 to assist the negative applied pressures in maintaining passageway 92 thin and uniform substantially over the entire panel.

Figure 7:
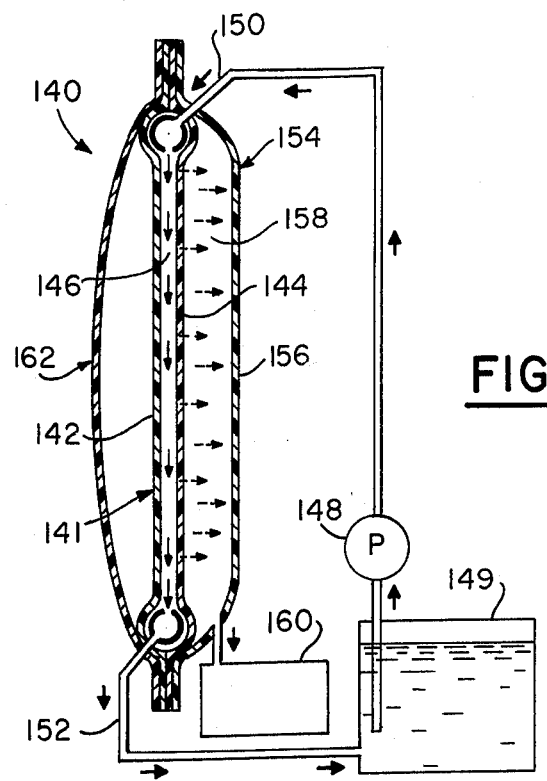
FIG. 7 is a longitudinal section view of another modification showing the rear wall made of vapor permeable material with an attached condenser unit.

FIG. 7 illustrates a novel solar heat exchange panel 140 utilized for the purpose of fresh water distillation, particularly suitable as a survival still for ditched aviators, etc. Panel 140 comprises a salt water container 141 having a front film wall 142 preferably of a suitable black thin plastic material, and a rear wall 144 made of vapor permeable and liquid impermeable material, forming therebetween a passageway 146 for the liquid, namely, salt water. Such material is commercially available being made of polymeric coated fabrics, "Corfam", "PORON", etc. Rear wall 144 is impermeable to the passage of any liquid, but is vapor permeable. Salt water is circulated by any suitable pump 148 from tank 149 to panel inlet 150, and from outlet 152 the salt water drains back to tank 149. A fresh water condensate container 154 is formed by a third exterior wall 156 secured to rear wall 144 and forming a passageway 158 for the fresh water condensate shown in broken-line arrows leading to a suitable reservoir 160. Wall 156 of container 154 is cooled by external ambient air to condense the vapor passing through passageway 158, although other cooling means may be provided.

Similarly as the species shown in FIGS. 5 and 6, front film wall 142 may be provided with an air bubble 162 for the same purposes, namely, for insulation purposes, and also to apply an external pressure to maintain a thin and uniform passageway 158.

In FIG. 8 is illustrated another solar still formed of a panel 170 constructed very similar to the embodiment of FIGS. 1 and 2 with hose connections 171 in lieu of manifold inlet and outlet pipes. The differences being that air is induced at inductor 172 into the salt water flow at water inlet 174 forming an air-water mix that is discharged into the panel passageway 178. As the air-water mix flows downward in the passageway the mix is heated by the sun and is partially vaporized, all being discharged from the panel in outlet hose connection 180. The water particles settle in tank 182, the remaining air flow is cooled at 183 by any conventional method, the condensate being accumulated in tank 184, and the air discharged at 186.

FIGS. 9 and 10 show an atmospheric heat exchanger 190 mounted to and supported by the exterior of its hot water reservoir tank 192. Exchanger 190 is constructed of a panel 194 having inner and outer thin film walls 196 and 198, respectively, forming a passageway 200, similar to FIGS. 1 and 2, but formed in circular configuration to conform to the tank. As the northerly portion of tank 192 will be the shaded side, passageway 200 need not traverse that portion of the tank, and instead the panel formed with an inflatable air bubble 202 (FIG. 10) which serves to apply tension to secure the panel to the tank, as well as supplying external pressure on the panel to maintain the uniformity of passageway 200 so far as its optimum minimum thickness, as well as spreading the flow over the entire panel. In operation, colder water on top of the tank is admitted to the panel at inlets 204. The water absorbs the solar energy on its flow down through the panel and is withdrawn at outlets 206 at the bottom of the panel, and by means of pump 208 introduced to the bottom of the tank. When hot water is withdrawn from the tank for use, make-up water is added in a conventional manner to maintain the overflow height of the heated water in the tank.

Obviously many modifications and variations of the present invention are possible in the light of the above teachings. It is therefore to be understood that within the scope of the appended claims the invention may be practiced otherwise than as specifically described.

What is claimed is:

1. An atmospheric heat exchanger comprising:
   a sealed container having front and rear walls both made of thin, pliable sheet material having substantially the same physical properties and having smooth inner surfaces capable of contacting each other in face-to-face relationship defining therebetween an unrestricted liquid passageway substantially throughout the inner dimensions of said walls, said container walls capable of conforming to the shape of its supporting structure;
   said container having liquid inlet and outlet means for circulating a liquid medium through said container;
   negative pressure means for maintaining said conformable film walls in close, uniform relation to said other wall to define a liquid passageway therebetween having a minimum thickness;
   whereby said minimum thickness passageway creates a venturi to uniformly spread the liquid over the entire passageway and to increase the velocity of the liquid flow therethrough to enhance the heat transfer between said walls and said liquid.

2. The heat exchanger of claim 1 wherein said outlet includes a uniformly perforated tubular mesh member enclosed by the pliable ends of both walls.

3. The heat exchanger of claim 1 wherein said container is constructed in tubular form with the open opposite wall ends sealed together.

4. The heat exchanger of claim 1 wherein the liquid inlet is positioned at the top of the container;
   means for introducing air into said liquid inlet whereby air bubbles are formed in the water flow downward through said passageway;

a collector at the bottom of said container for collecting the heated vaporized air particles and water carrier;

means for removing the water carrier;

a condenser for removing distilled vapor from said air flow; and means for collecting the distilled water.

5. The heat exchanger of claim 1 wherein said rear wall is of a vapor permeable and liquid impermeable material;

a spaced enclosure mounted to said rear wall; and condensing means provided for said enclosure whereby vapor passing through said rear wall will condense within said enclosure.

6. The heat exchanger of claim 1 wherein an upright liquid tank is provided for supporting the container;

a portion of said container being air inflatable for securing the container to the periphery of said tank.

7. The heat exchanger of claim 6 wherein said tank is a reservoir for said container.

8. An atmospheric heat exchanger comprising:

a container having front and rear walls having smooth inner surfaces capable of contacting each other in face-to-face relationship defining therebetween an unrestricted liquid passageway substantially throughout the inner dimensions of said walls;

said container having liquid inlet and outlet means for circulating a liquid medium through said container;

at least one wall of said container being made of a thin pliable and conformable plastic film material;

negative pressure means for maintaining said conformable film walls in close, uniform relation to said other wall to define a liquid passageway therebetween having a minimum thickness;

said outlet means including a perforated pipe having a tubular netting material telescopically mounted thereover to prevent the pliable plastic film from blocking the discharge flow therethrough;

whereby said minimum thickness passageway creates a venturi to uniformly spread the liquid over the entire passageway and to increase the velocity of the liquid flow therethrough to enhance the heat transfer between said walls and said liquid.

* * * * *